United States Patent
Kase

(10) Patent No.: US 7,365,832 B2
(45) Date of Patent: Apr. 29, 2008

(54) LASER RANGE FINDER

(75) Inventor: Teiji Kase, Tokyo (JP)

(73) Assignee: Nec Corporation, Tokyo (JP)

( * ) Notice: Subject to any disclaimer, the term of this patent is extended or adjusted under 35 U.S.C. 154(b) by 244 days.

(21) Appl. No.: 10/943,836

(22) Filed: Sep. 20, 2004

(65) Prior Publication Data

US 2005/0061957 A1  Mar. 24, 2005

(30) Foreign Application Priority Data

Sep. 19, 2003  (JP) .............................. 2003-328277

(51) Int. Cl.
*G01C 3/08* (2006.01)
(52) U.S. Cl. ................. 356/5.01; 356/139.04
(58) Field of Classification Search ............... 356/5.01, 356/139.04
See application file for complete search history.

(56) References Cited

U.S. PATENT DOCUMENTS

| 4,113,382 A | * | 9/1978 | Freudenschuss | ........... 356/5.08 |
| 4,681,433 A | * | 7/1987 | Aeschlimann | ........... 356/141.1 |
| 5,313,409 A | * | 5/1994 | Wiklund et al. | ......... 356/141.1 |
| 5,892,575 A | * | 4/1999 | Marino | ....................... 356/5.01 |
| 6,064,942 A | * | 5/2000 | Johnson et al. | ............. 701/213 |
| 6,433,856 B1 | * | 8/2002 | Yoo | .......................... 356/3.01 |
| 6,657,705 B2 | * | 12/2003 | Sano et al. | ............... 356/141.1 |
| 6,724,470 B2 | * | 4/2004 | Barenz et al. | ............. 356/4.01 |

FOREIGN PATENT DOCUMENTS

| JP | 54-104366 | 8/1979 |
| JP | 59-198378 | 11/1984 |
| JP | 8-15433 | 1/1996 |
| JP | 8-62334 | 3/1996 |
| JP | 8-122434 | 5/1996 |
| JP | 9-240600 | 9/1997 |
| JP | 9-243750 | 9/1997 |
| JP | 10-132933 | 5/1998 |
| JP | 10-239600 | 9/1998 |
| JP | 2000-68934 | 3/2000 |

\* cited by examiner

*Primary Examiner*—Thomas H. Tarcza
*Assistant Examiner*—Timothy Brainard
(74) *Attorney, Agent, or Firm*—Young & Thompson

(57) ABSTRACT

A laser range finder measures the range between itself and another laser range finder by propagating a laser beam only in one way therebetween. A laser unit generates a short-pulse laser beam to be transmitted to the other laser range finder. A photodetector receives a short-pulse laser beam transmitted from the other laser range finder and detects the direction of the other laser range finder. A pointing unit adjusts the direction the laser beam generated by the laser unit is to be transmitted, into alignment with the direction of the other laser range finder. A controller stores in advance a holding time after the other laser range finder receives the short-pulse laser until the other laser range finder transmits the short-pulse laser, and calculates the range between the laser range finders from the time the short-pulse laser beam is transmitted, the short-pulse laser beam is received, and the holding time.

8 Claims, 3 Drawing Sheets

(a)

(b)

LASER RANGE FINDER

BACKGROUND OF THE INVENTION

1. Field of the Invention

The present invention relates to an apparatus for laser ranging, and more particularly to a laser range finder for use on a satellite for inter-satellite ranging.

2. Description of the Related Art

For accurate inter-satellite time synchronization, it is necessary to accurately measure the inter-satellite range, which runs up to 70,000 km.

One apparatus for accurately measuring long ranges is a laser range finder using short-pulse laser (see, for example, Japanese laid-open patent publication No. 10-239600). The conventional laser range finder emits a short-pulse laser beam toward a target and detects the laser beam reflected from the target to measure the distance up to the target. This range-finding process will be hereafter referred to as a reflected beam reception process.

If a moving object such as a satellite is a target, then the laser range finder directs the laser beam toward the target while tracking the moving target (the process will hereinafter referred to as pointing). Tracking the target requires positional information of the target. Usually, since the positions of satellites are managed on the ground, when a satellite measures the distance up to another satellite, the positional information can be given to the ranging satellite from the ground.

However, the conventional laser range finder suffers the following problems:

For ranging according to the conventional reflected beam reception process, since the laser beam needs to travel to the target and then back, a laser system having a large output capability and a large size is required. For example, for measuring the distance up to a satellite that is about 40,000 km high from the ground, then a laser output capability of about 1 joule is required even if the satellite has a laser reflecting mirror such as a corner cube reflector, and the laser having a large size of 3 m×1.5 m×1.5 m has to be used. Therefore, the conventional reflected beam reception process is not suitable for use on satellites for inter-satellite ranging.

The positional information that is sent from the ground to a satellite for tracking a moving satellite to point the laser beam suffers a large positional error and is not in real-time. Therefore, the positional information from the ground is not sufficient for use on the laser range finder on the satellite for tracking the target.

Another problem is that laser range finders on satellites have their laser oscillators tending to cause a misalignment due to harsh environmental changes in space, and hence have a reduced laser output capability.

Because of the various factors described above, it is difficult for the conventional laser range finder to measure the inter-satellite range sufficiently accurately in real-time.

SUMMARY OF THE INVENTION

It is therefore an object of the present invention to provide a small-size laser range finder which is capable of measuring the inter-satellite range sufficiently accurately in real-time.

To achieve the above object, a laser range finder for measuring the range between itself and another laser range finder has a laser unit, a photodetector, a pointing unit, and a controller.

The laser unit generates a short-pulse laser beam to be transmitted to the other laser range finder. The photodetector receives a short-pulse laser beam transmitted from the other laser range finder and detecting the direction of the other laser range finder. The pointing unit adjusts the direction in which the laser beam generated by the laser unit is to be transmitted, into alignment with the direction of the other laser range finder which is detected by the photodetector. The controller calculates the distance between the own laser range finder and the other laser range finder from a time at which the short-pulse laser beam is transmitted and a time at which the short-pulse laser beam is received.

The controller may store in advance a time after the other laser range finder receives the short-pulse laser until the other laser range finder transmits the short-pulse laser, and use the stored time in calculating the distance between the own laser range finder and the other laser range finder.

The above and other objects, features, and advantages of the present invention will become apparent from the following description with reference to the accompanying drawings which illustrate an example of the present invention.

DESCRIPTION OF THE PREFERRED EMBODIMENT

Figure 1:
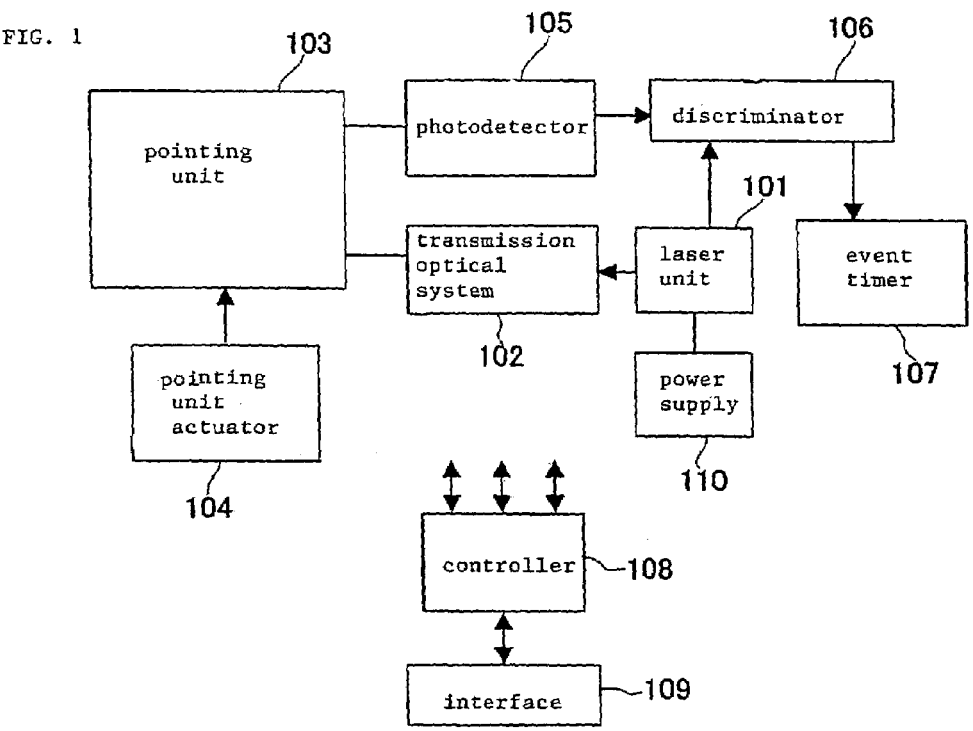
FIG. 1 is a block diagram of a laser range finder according to an embodiment of the present invention.

FIG. 1 shows in block form a laser range finder according to an embodiment of the present invention. As shown in FIG. 1, the laser range finder comprises laser unit 101, transmission optical system 102, pointing unit 103, pointing unit actuator 104, photodetector 105, discriminator 106, event timer 107, controller 108, interface 109, and power supply 110.

Laser unit 101 comprises a monolithic laser oscillator for emitting a short-pulse laser beam. The monolithic laser oscillator is a passive Q switch employing, as a saturable absorber, a $Cr^{4+}$-doped YAG (Yttrium Aluminum Garnet) ($Cr^{4+}$:YAG) crystal.

Figure 2:
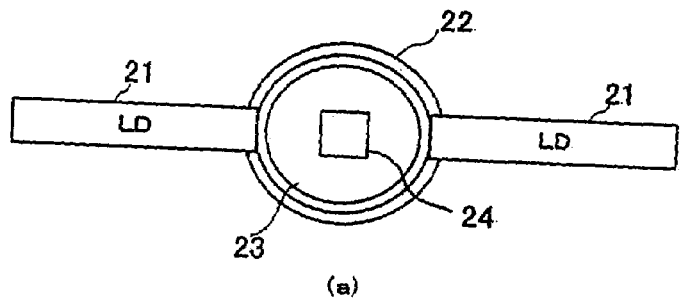
FIGS. 2(a) and 2(b) are views showing structural details of a monolithic laser oscillator of the laser range finder.
Figure 2:
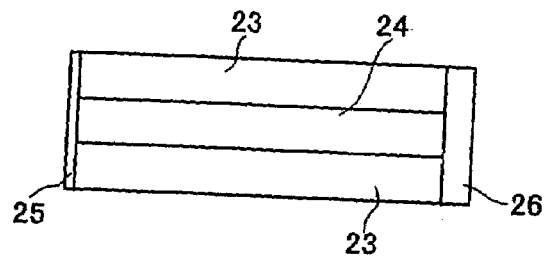

FIGS. 2(a) and 2(b) show structural details of the monolithic laser oscillator. As shown in FIGS. 2(a) and 2(b), the monolithic laser oscillator has non-doped YAG 23 disposed in light collection tube 22 having an inner layer of $BaSO_4$, and Nd YAG crystal 24 as a laser medium disposed in non-doped YAG 23. Nd YAG crystal 24 has a size of 3☐×10 mm.

One end 25 of light collection tube 22 is coated with a total reflecting mirror. Other end 26 is coated with a 70% reflecting mirror and has a saturable absorber of $Cr^{4+}$:YAG crystal. These reflecting mirrors on the opposite ends of light collection tube 22 serve as a mirror pair of a resonator.

The saturable absorber of $Cr^{4+}$:YAG crystal and Nd YAG crystal 24 are bonded to each other. The saturable absorber of $Cr^{4+}$:YAG crystal serves as a shutter for emitting a short laser pulse having a wavelength of 1064 nm.

The monolithic laser oscillator can have its resonator length reduced and has a highly environment-resistant alignment, and is suitable for use on satellites.

As shown in FIG. 1, transmission optical system 102 shapes a laser beam emitted from laser unit 101 into a laser beam having a desired spreading angle.

Photodetector 105 detects a laser beam sent from a companion satellite. Photodetector 105 also divides a portion of the laser beam from the companion satellite, and determines the direction of the companion satellite with a pointing detection field-of-view sensor based on the divided portion of the laser beam.

Figure 3:
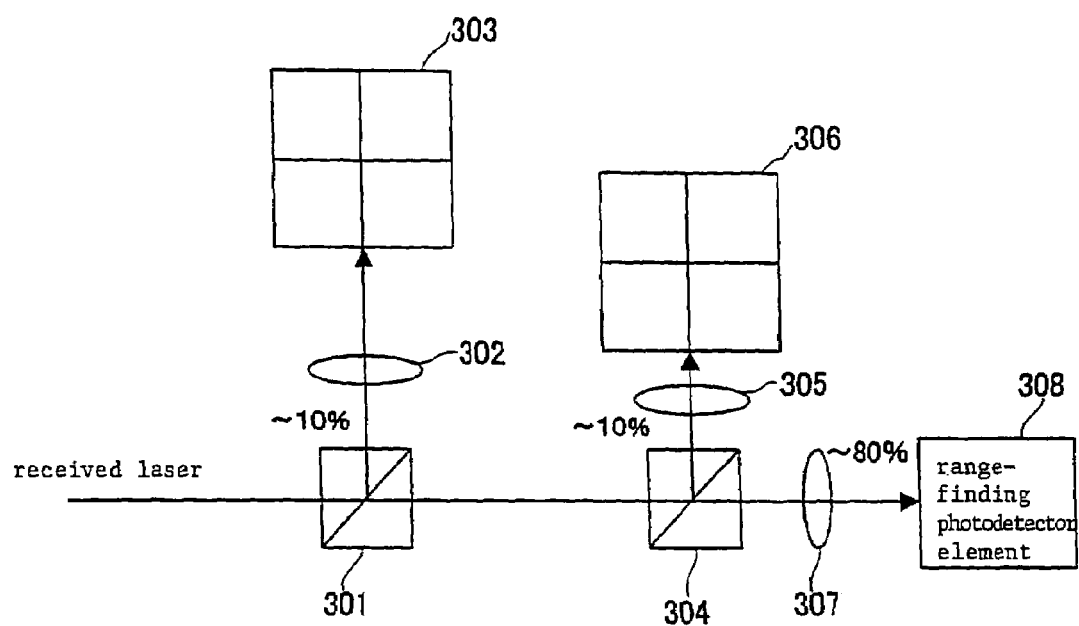
FIG. 3 is a diagram showing the concept of a pointing detection field-of-view sensor.

FIG. 3 shows the concept of the pointing detection field-of-view sensor. As shown in FIG. 3, the received laser beam is divided by beam splitter 301 into 10% of laser beam, which is converged by condenser lens 302 and applied to coarse-adjustment pointing sensor 303.

Coarse-adjustment pointing sensor 303 has four Si photodiode segments, for example, which detect the laser beam. Based on the light intensities detected respectively by the four Si photodiode segments, coarse-adjustment pointing sensor 303 detects the direction of the satellite which has sent the laser beam, coarsely in real-time in a wide field of view.

The received laser beam is further divided by beam splitter 304 into 10% of laser beam, which is converged by condenser lens 305 and applied to fine-adjustment pointing sensor 306.

Fine-adjustment pointing sensor 306 has four Si photodiode segments, for example, which detect the laser beam. Based on the light intensities detected respectively by the four Si photodiode segments, fine-adjustment pointing sensor 306 detects the direction of the satellite which has sent the laser beam, finely in real-time in a narrow field of view.

The wide field of view of coarse-adjustment pointing sensor 303 and the narrow field of view of fine-adjustment pointing sensor 306 are established respectively by the focal lengths of condenser lenses 302, 305. These two sensors are jointly capable of accurately detecting the direction of the companion satellite. Each of coarse-adjustment pointing sensor 303 and fine-adjustment pointing sensor 306 may be a field-of-view sensor for detecting the direction in which an incoming laser beam arrives thereat based on the detected light intensities of a plurality of photodetector elements which convert a light signal into an electric signal, and is not limited to the four-segment Si photodiode. For example, each of coarse-adjustment pointing sensor 303 and fine-adjustment pointing sensor 306 may be a CCD camera.

The remaining laser beam, i.e., 80% of laser beam, after beam splitter 304 is converged by condenser lens 307 and applied to range-finding photodetector element 308 comprising an Si-APD (Avalanche PhotoDiode).

As shown in FIG. 1, discriminator 106 detects the signal detected by range-finding photodetector element 308 of photodetector 105 and converts the signal into a time-reading trigger signal.

Event timer 107 is a timer for accurately determining the clock in the satellite.

Pointing unit 103 is actuated by pointing unit actuator 104 for adjusting the direction in which the laser beam is emitted, according to the information detected by coarse-adjustment pointing sensor 303 and fine-adjustment pointing sensor 306.

Controller 108 controls various components of the laser range finder. For example, controller 108 sets a timing to send the laser beam. Controller 108 records times at which the laser beam is sent and received. Furthermore, controller 108 performs a process of calculating the distance up to the companion satellite. For example, controller 108 records a time at which the laser beam is sent to the companion satellite, records a time at which the laser beam is received from the companion satellite, and calculates the distance up to the companion satellite from the recorded times.

Interface 109 serves as an interface for connection to a device (not shown) outside of the laser range finder. Power supply 110 supplies electric power to various components of the laser range finder, e.g., laser unit 101.

Figure 4:
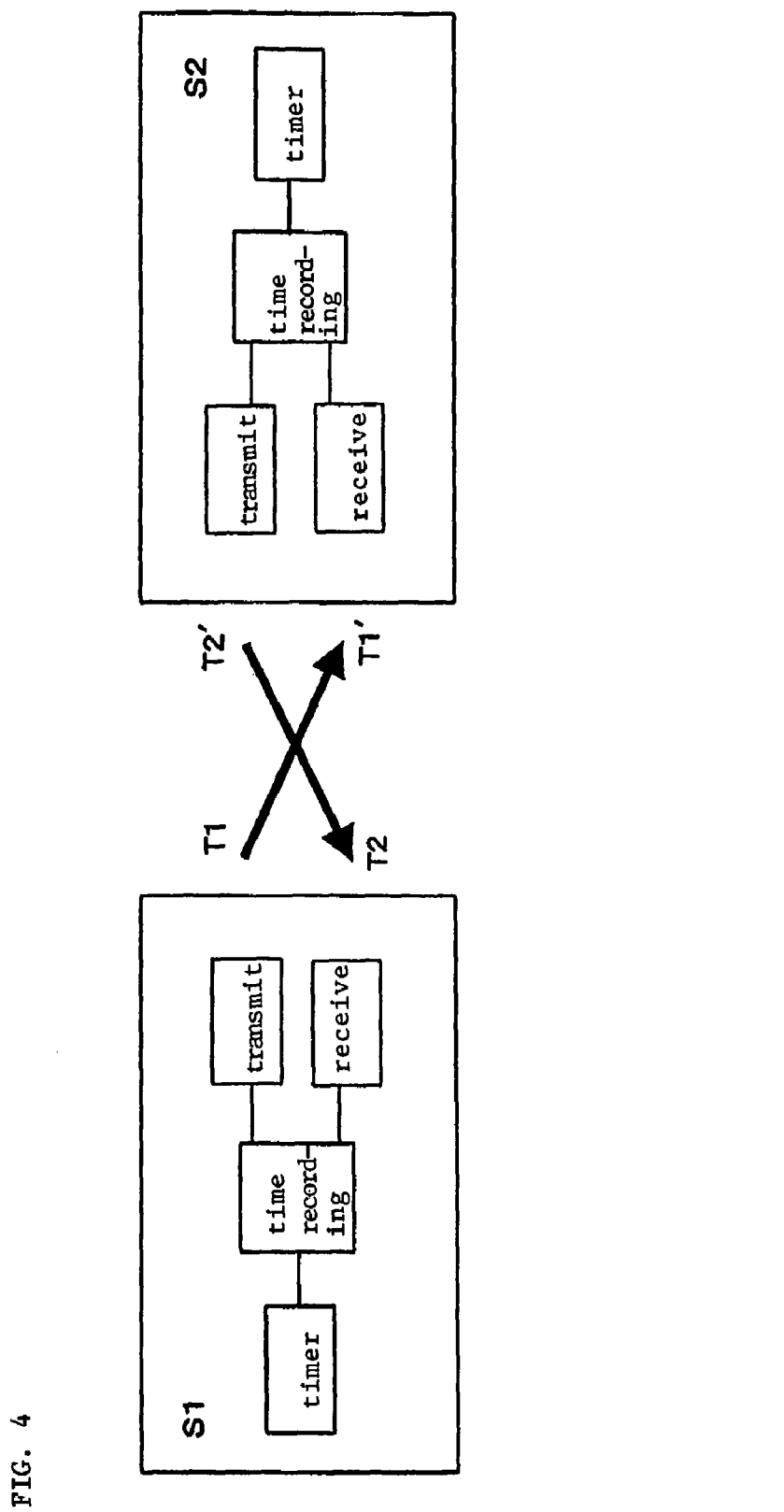
FIG. 4 is a diagram illustrative of operation of the laser range finder according to the embodiment for inter-satellite laser ranging.

FIG. 4 is illustrative of operation of the laser range finder according to the embodiment for inter-satellite laser ranging. In FIG. 4, the range between laser range finder S1 and laser range finder S2 is measured.

First, laser range finder S1 adjusts its direction toward a satellite which carries laser range finder S2, with pointing unit 103, and emits a short-pulse laser beam from laser unit 101 through transmission optical system 102 at time T1. At this time, controller 108 of laser range finder S1 records time T1 in a memory.

The laser range transmitted from laser range finder S1 is received at time T1' by photodetector 105 of laser range finder S2. Discriminator 106 of laser range finder S2 converts the short pulse into a trigger signal. Triggered by the trigger signal, controller 108 records time T1' at which the short pulse is received.

Laser beam finder S2 adjusts its direction toward the satellite which carries laser beam finder S1, with pointing unit 103, and emits a short-pulse laser beam from laser unit 101 through transmission optical system 102 at time T2' that is predetermined holding time T after time T1'. At this time, controller 108 of laser beam finder S2 records time T2' in a memory.

The laser beam transmitted from laser range finder S2 is received at time T2 by photodetector 105 of laser range finder S1. Discriminator 106 of laser range finder S1 converts the short pulse into a trigger signal. Triggered by the trigger signal, controller 108 records time T2 at which the short pulse is received.

Controller 108 of laser range finder S1 calculates the distance up to laser range finder S2 using times T1, T2 and holding time T. Specifically, since the time required for the short pulse to travel from laser range finder Si to laser range finder S2 is (T2−T1−T)/2, the distance between laser range finders S1, S2 is expressed by c×(T2−T1−T)/2 where c is the speed of light.

With the laser range finder according to the present embodiment, when the range between two satellites is to be measured, both laser range finders send laser beams to each other, and the range between them is calculated from the times at the laser beam is sent and received. Therefore, the laser beam may be propagated only in one way from one of the satellites to the other. The laser system may thus be of a smaller size than with the conventional reflected beam reception process. For example, for measuring the range between two satellites that are spaced apart about 70,000 km from each other, a laser output capability of about several millijoule is large enough, and the laser oscillator may be fabricated in a size of 0.1 m×0.1 m×0.1 m.

With the laser range finder according to the present embodiment, furthermore, the laser beam sent from the laser range finder carried on the companion satellite is received by the field-of-view sensor of photodetector 105 to detect the direction of the companion satellite accurately in real-time, and the direction in which the laser beam is sent from the satellite toward the companion satellite is adjusted by pointing unit 103. Therefore, the laser beam can continuously reliably be directed toward the companion satellite.

With the laser range finder according to the present embodiment, furthermore, inasmuch as laser unit 101 comprises a monolithic laser oscillator in the form of a passive Q switch, laser beam 101 is highly environment-resistant and does not tend to lower its laser output capability even with harsh environmental changes in space.

While a preferred embodiment of the present invention has been described using specific terms, such description is for illustrative purposes only, and it is to be understood that changes and variations may be made without departing from the spirit or scope of the following claims.

What is claimed is:

1. First and second laser range finders for measuring a range between said first laser range finder and said second laser range finder that moves with respect to the first laser range finder, each of said first and second laser range finders having a same structure and comprising:
    a laser unit for generating a first short-pulse laser beam to be transmitted to the other of said first and second laser range finder;
    a photodetector for receiving a second different short-pulse laser beam generated by and transmitted from the other of said first and second laser range finder and detecting the direction of said other of said first and second laser range finder;
    a pointing unit for adjusting the direction in which the laser beam generated by said laser unit is to be transmitted, into alignment with the direction of the other of said first and second laser range finder which is detected by said photodetector; and
    a controller for calculating a distance between the first laser range finder and said second laser range finder from a time at which said first short-pulse laser beam is transmitted and a time at which said second short-pulse laser beam is received.

2. The laser range finders according to claim 1, wherein said controller stores in advance a time after the other of said first and second laser range finder receives the short-pulse laser until the other of said first and second laser range finder transmits the second short-pulse laser beam, and uses the stored time in calculating the distance between the first laser range finder and said second laser range finder.

3. The laser range finders according to claim 1, wherein said photodetector has a field-of-view sensor for detecting the direction the second short-pulse laser beam comes, from the light intensities detected by a plurality of photodetector elements.

4. laser range finders according to claim 3, wherein each of said photodetector elements comprises an Si photodiode.

5. The laser range finders according to claim 1, wherein said laser unit comprises a monolithic laser oscillator.

6. The laser range finders according to claim 5, wherein said monolithic laser oscillator comprises a passive Q switch for generating the short-pulse laser beam.

7. The laser range finders according to claim 1, adapted to be carried on satellites for measuring the range between one of said satellites and another one of said satellites.

8. First and second laser range finders for measuring a range between a first satellite and a second satellite, each said laser range finder having a same structure and comprising:
    a laser unit for generating a first short-pulse laser beam that is sent in only one direction from one of said first and second satellite to the other of said first and second satellite;
    a photodetector for receiving a second short-pulse laser beam sent in only one direction from the other of said first and second satellite, and detecting the direction of the other of said first and second satellite;
    a pointing unit for adjusting the direction in which the laser beam generated by said laser unit is to be transmitted, into alignment with the direction of the other of said first and second satellite which is detected by said photodetector; and
    a controller for calculating a distance between the first satellite and second satellite based on a time at which the first short-pulse laser beam is transmitted and a time at which the second short-pulse laser beam is received.

* * * * *